United States Patent
Ochs et al.

(10) Patent No.: US 8,038,773 B2
(45) Date of Patent: Oct. 18, 2011

(54) INTEGRATED CAPTURE OF FOSSIL FUEL GAS POLLUTANTS INCLUDING CO$_2$ WITH ENERGY RECOVERY

(75) Inventors: Thomas L. Ochs, Albany, OR (US); Cathy A. Summers, Albany, OR (US); Steve Gerdemann, Albany, OR (US); Danylo B. Oryshchyn, Philomath, OR (US); Paul Turner, Independence, OR (US); Brian R. Patrick, Chicago, IL (US)

(73) Assignee: Jupiter Oxygen Corporation, Schiller Park, IL (US)

( * ) Notice: Subject to any disclaimer, the term of this patent is extended or adjusted under 35 U.S.C. 154(b) by 809 days.

(21) Appl. No.: 11/753,393

(22) Filed: May 24, 2007

(65) Prior Publication Data

US 2008/0016868 A1   Jan. 24, 2008

Related U.S. Application Data

(63) Continuation-in-part of application No. 11/306,437, filed on Dec. 28, 2005.

(60) Provisional application No. 60/808,095, filed on May 24, 2006.

(51) Int. Cl.
    *B01D 53/14* (2006.01)
(52) U.S. Cl. ............... 95/196; 95/205; 95/230; 95/236; 110/203; 110/345
(58) Field of Classification Search ............... 95/156
    See application file for complete search history.

(56) References Cited

U.S. PATENT DOCUMENTS

| | | | |
|---|---|---|---|
| 3,630,887 A * | 12/1971 | Mounce | ............ 208/100 |
| 4,041,708 A | 8/1977 | Wolff | |
| 4,411,136 A | 10/1983 | Funk | |
| 4,513,573 A | 4/1985 | Funk | |
| 4,542,114 A | 9/1985 | Hegarty | |
| 5,122,352 A | 6/1992 | Johnson | |
| 5,783,082 A * | 7/1998 | DeSimone et al. | ............ 210/634 |
| 5,787,821 A | 8/1998 | Bhat et al. | |
| 5,826,518 A | 10/1998 | Bhat et al. | |
| 6,119,606 A | 9/2000 | Clark | |
| 6,196,000 B1 | 3/2001 | Fassbender | |
| 6,202,574 B1 | 3/2001 | Liljedahl et al. | |
| 6,436,337 B1 | 8/2002 | Gross | |
| 6,596,220 B2 | 7/2003 | Gross | |
| 6,598,398 B2 | 7/2003 | Viteri et al. | |
| 6,797,228 B2 | 9/2004 | Gross | |
| 6,818,176 B2 | 11/2004 | Gross | |
| 6,898,936 B1 * | 5/2005 | Ochs et al. | ............ 60/649 |
| 6,918,253 B2 | 7/2005 | Fassbender | |
| 7,007,474 B1 | 3/2006 | Ochs et al. | |
| 2003/0097840 A1 | 5/2003 | Hsu | |
| 2004/0046293 A1 | 3/2004 | Gross | |
| 2004/0237909 A1 | 12/2004 | Krebs | |
| 2007/0207419 A1 | 9/2007 | Patrick | |

* cited by examiner

*Primary Examiner* — Duane Smith
*Assistant Examiner* — Tiffany N Palmer
(74) *Attorney, Agent, or Firm* — John S. Paniaguas; Katten Muchin Rosenman LLP

(57) ABSTRACT

A method of reducing pollutants exhausted into the atmosphere from the combustion of fossil fuels. The disclosed process removes nitrogen from air for combustion, separates the solid combustion products from the gases and vapors and can capture the entire vapor/gas stream for sequestration leaving near-zero emissions. The invention produces up to three captured material streams. The first stream is contaminant-laden water containing $SO_x$, residual $NO_x$ particulates and particulate-bound Hg and other trace contaminants. The second stream can be a low-volume flue gas stream containing $N_2$ and $O_2$ if CO2 purification is needed. The final product stream is a mixture comprising predominantly $CO_2$ with smaller amounts of $H_2O$, Ar, $N_2$, $O_2$, $SO_x$, $NO_x$, Hg, and other trace gases.

16 Claims, 1 Drawing Sheet

INTEGRATED CAPTURE OF FOSSIL FUEL GAS POLLUTANTS INCLUDING CO$_2$ WITH ENERGY RECOVERY

CROSS REFERENCE TO RELATED APPLICATION

This application is a continuation-in-part of commonly owned and co-pending U.S. patent application Ser. No. 11/306,437, filed on Dec. 28, 2005, hereby incorporated by reference. This application also claims priority to U.S. Provisional Patent Appl. No. 60/808,095, filed on May 24, 2006, also incorporated by reference.

The United States Government has rights in this invention pursuant to employer/employee agreements between the U.S. Department of Energy (DOE) and some of the inventors and through license agreements with the assignee of the invention.

BACKGROUND OF THE INVENTION

The climatic changes resulting from the rise of greenhouse gas concentration in the atmosphere are becoming an increasingly important concern to those who regulate the operation and flue gas output of fossil-fuel combustion-based power plants. Unregulated and uncontrolled fossil fuel burning power plants have been responsible for a significant portion of this pollution. As pollution regulations have become more stringent, processes and equipment have been installed to prevent the uncontrolled exhaust of particulate matter, such as SOx, and NOx. Further, the reduction of mercury (Hg) in exhausted gases has also been proposed, and operations are being developed and installed for its control. Significantly, the carbon dioxide (CO$_2$) stream, from combustion in such plants, has been found to be the more massive constituent of pollution, larger than any other pollutant stream, and so will now require a significant increase in effort and cost to bring under control.

Unfortunately, it has been found that including CO$_2$ capture devices and processes to the present day series of separate processes used in pollution control and abatement, which are dedicated to the removal of single pollutant types, has proved to be prohibitively costly.

SUMMARY OF THE INVENTION

The present invention is directed to the removal of streams of various elements of pollution and the combinations of some existing pollution removal methods with energy recovery methods in order to remove more pollutants at less overall cost and with more fuel efficiency. In particular the method is directed to capturing CO$_2$ and delivering, for safe and clean removal, a stream of CO$_2$ alone and/or a stream of CO$_2$ containing any combination of waste elements including H$_2$O, Ar, N$_2$, O$_2$, SO$_X$, NO$_X$, and Hg and traces of other post-combustion materials.

Such removal of pollutant streams is adaptable to both new and existing power plants, as will be explained in greater detail below, and as is expressed, in part in U.S. Pat. No. 6,898,936 assigned to the U.S. Department of Energy and U.S. Pat. No. 6,436,337 assigned to Jupiter Oxygen Corporation, both assignees of which are working together in the implementation of the present invention and each of which has interests, as explained above, in the present application. Both of these references are incorporated in their entirety herein.

The present invention therefore is intended for use with furnaces, boilers and other fossil fuel combustion systems having at least one burner that is fed by carbon based fuel. Typically such burners are fired in the presence of ambient air such that the initial combustion contributed to the creation of pollutants, especially NO$_X$. In such systems the process includes the combustion of fuel to create heat and flue gasses. The combustion system of the present invention comprises, in addition to the burner, a boiler or other device functional to the desired process and one or more of each of a particulate removal system (such as a cyclone), a heat exchanger, a compressor, a filter, and a flue stream splitter, as will be described in greater detail below. In a preferred embodiment of the present invention, the combustion system further includes equipment permitting the burning of fuel in near stoichiometric proportions with generally pure oxygen mixed with recirculated flue-gas; alternatively, another embodiment can include a combustion system designed to use pure or generally pure oxygen injected as the combustion supporting fluid; and also a third embodiment, wherein the invention processes the oxidation products of an Integrated Gasification Combined Cycle (IGCC) gasification unit.

The method, therefore of capturing CO$_2$ and delivering a stream of CO$_2$ containing any combination of chemicals including H$_2$O, Ar, N$_2$, O$_2$, SO$_X$, NO$_X$, and Hg and traces of other post-combustion materials includes, conveying the flue gas generated by the combustion system, into a heat exchanger wherein the flue gas is cooled, with cooling fluid, to a temperature where water and any condensable vapors present in the flue gas can be condensed and removed as liquid condensate. The liquid condensate exits the heat exchanger either as a separate stream in the case of indirect heat exchange or along with the cooling fluid in the case of direct heat exchange. The method further includes, filtering and treating the liquid stream (either condensate or condensate and cooling fluid) so that all pollutants are disposed of and pure water is released. Further, the gas exiting the heat exchanger is compressed, in at least one compressor, into a CO$_2$ stream suitable for disposal or other applications. In one embodiment, the method further comprises the step of purifying the CO$_2$ stream exiting the compressor until it has purity of greater than 90%.

In alternative embodiments of the present invention, the CO$_2$ stream exiting the compressor is a supercritical stream; the CO$_2$ stream exiting the compressor is a multiphase stream; and the CO$_2$ stream exiting the compressor is a single-phase mixture.

In an embodiment of the present invention, the combustion reaction inside the boiler is also fed by recycled flue gas. In other embodiments, the method of claim includes a step of recycling the cooling fluid exiting the heat exchanger back to the front of the heat exchanger.

In other embodiments, the method of the present invention, the cooling fluid is cooled to the temperature at which it will condense the hot vapors in the flue gas in the heat exchanger. It will be understood that any type of carbon-based fuel can be used in the combustion system of the present invention, and that in one embodiment, the fuel is pulverized coal.

With respect to cooling, in one embodiment of the present invention the cooling fluid is water and can include purified waters. In some embodiments, the cooling fluid enters the heat exchanger as a spray. Further, in some embodiments the cooling fluid is cooled by an indirect heat exchanger. In some embodiments of the invention, the heat exchanger can be a counterflow direct contact heat exchanger.

It will therefore be understood by persons having ordinary skill in the art that the steps of the method of the present invention can be said, in at least one embodiment to encompass: combusting a fossil fuel and pure oxygen to produce a flue gas; conveying the flue gas into at least one heat exchanger; cooling the flue gas in at least one heat exchanger with cooling water to the temperature where water and is condensed and removed as liquid condensate (which exits the heat exchanger); filtering and treating the liquid condensate so that a significant portion of all pollutants are disposed of and pure water is released. Additionally, the gas exiting the heat exchanger is compressed at least one compressor until it is a $CO_2$ stream suitable for disposal or other applications; and further, flue gas can be recirculated back into the combustion system to continue the process.

As will be explained in greater detail below, in association with an illustrative embodiment of the present invention, the process of the present invention, for capturing $CO_2$ can also be applied to the removal of other pollutants. Further, the energy transfers involved in this process can be positioned for maximal recovery into the power generation cycle such that capturing $CO_2$ need not unduly raise the cost of energy production.

Further objects, features and advantages of the present invention will be apparent from the following description and the appended claims when taken in conjunction with the accompanying drawing.

DETAILED DESCRIPTION OF THE ILLUSTRATIVE EMBODIMENT

Figure 1:
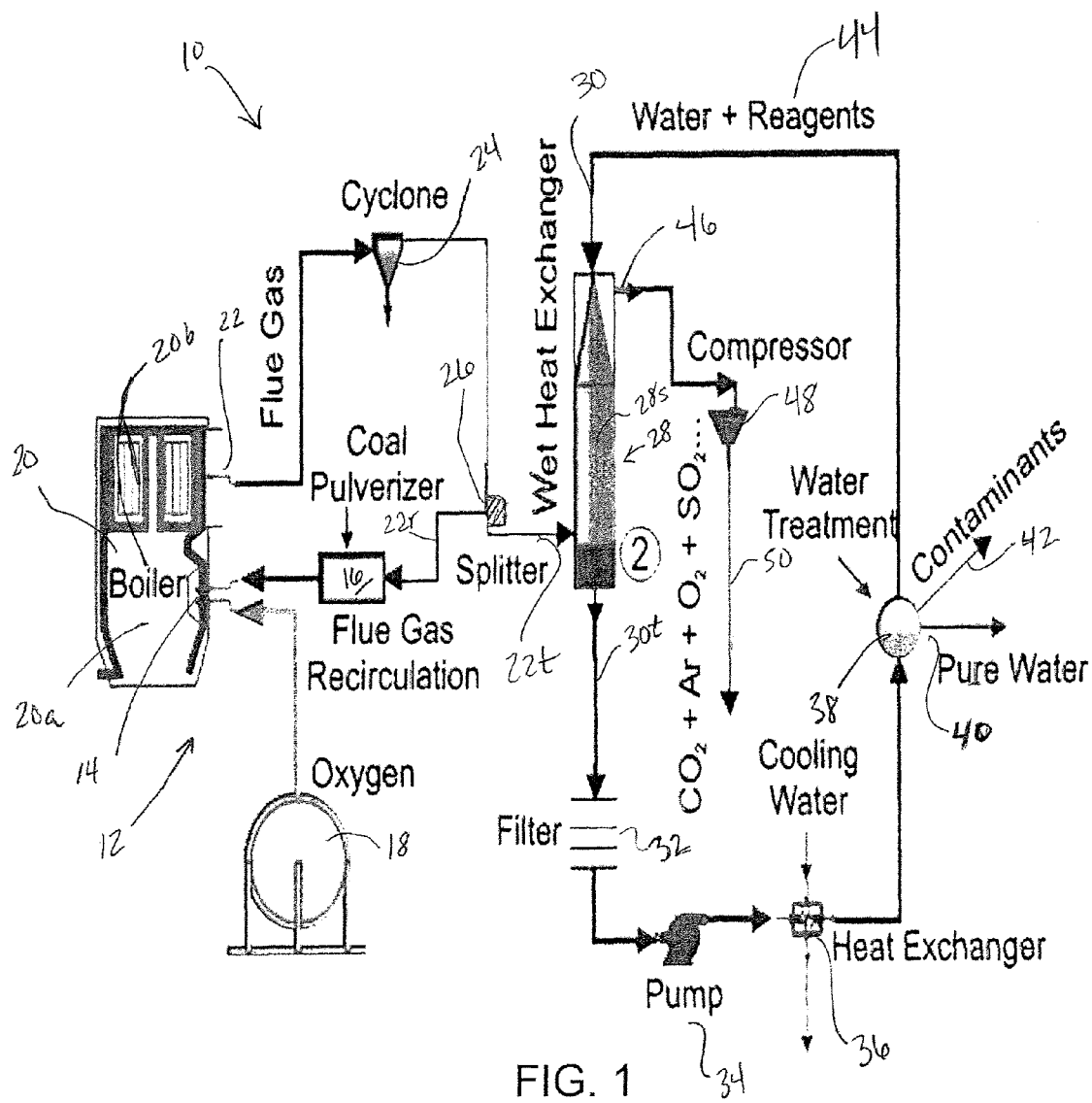
FIG. 1 is a schematic representation of a combustion system utilizing the method of the present invention.

While the present invention is susceptible of embodiment in various forms, there is shown in the drawing a presently preferred embodiment that is discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

The present invention is a method of reducing pollutants exhausted into the atmosphere from the combustion of carbon-based or fossil fuels, capturing flue gas pollutants, including $CO_2$ and recovering energy of combustion for reuse. The process of the present invention removes nitrogen from air for combustion, separates the solid combustion products from the gases and vapors, and can capture the entire vapor/gas stream for sequestration leaving near-zero emissions. The system of the present invention, including its various embodiments as described herein, can be applied to retrofit, repowering, upgrading, and greenfield plants; however, it will be understood by persons having ordinary skill in the art that almost any combustion system utilizing carbon-based fuels can be fitted or created utilizing the method of the present invention. The actual application of the invention will depend on the context of the installation including fuel, location, local regulations, incentives, power plant design, power plant condition, rights-of-way, and transportation access.

Referring now to the drawing, which shows a schematic representation of one type of combustion and pollution removal process system 10 to which the present invention can be applied. The combustion element 12 of the system comprises at least one burner 14 which is fed by a fuel source 16, here shown as a coal pulverizer, however persons having ordinary skill in the art will understand that any type of carbon-based fuel can be substituted therewith without departing from the novel scope of the present invention. The illustrative combustion element further includes a source of pure or nearly pure oxygen 18; it will be understood that the source of oxygen 18 can be in the form of oxygen tanks or any type of oxygen production facility, as is known by persons having ordinary skill in the art. In the present embodiment, the system comprises a boiler 20, comprising a combustion chamber 20a and a heat exchange system 20b, which in the present embodiment is shown as a series of water filled tubes and attendant parts thereof for the production of high-quality steam used in the production of electricity. It will be understood that the system can be any of a number of furnaces or boilers or other elements used to convert heat from the burning of fuel into energy, without departing from the novel scope of the present invention.

In the operation of the combustion element 12, the combustion chamber (or combustor) 20a is the situs of oxidation of carbonaceous fuel 16 using oxygen 18 and/or oxygen mixed with a recirculated flue gas product (as will be explained below). As will be understood by persons having ordinary skill in the art, the high concentrations of condensable vapors found in the combustor exhaust 22, that is the within the flue gas as it initially leaves the combustion chamber in an oxygen fed system of the type illustrated, makes a system of cooling-stripping-compression series energetically tenable because such a system avoids the inclusion of the large amounts of nitrogen that is found in air-supported combustion, as will be explained below. That is, the basis for cooling, stripping and compressing the by products of combustion is made economically tenable if the initial burning of fuel is made by a process that eliminates the deleterious by-products of burning nitrogen found in ambient air.

Referring again to FIG. 1, it will be seen that once the burning process is initiated flue gas 22, in the form of exhaust from the boiler 20, is created and the process for recirculating part (or none) of the flue gas, to utilize advantageous elements of the flue gas, and cooling the gas, so as to clean it of pollutants, begins. Flue gas 22 is exhausted out of the boiler 20 and through a cyclone 24 toward a splitter 26. It will be understood by persons having ordinary skill in the art that the use of a particulate removal system 24 is optional depending on the type of fuel used and is shown here for completeness. However, in the use of other carbon-based fuels, the particulate removal system 24 may not be necessary and therefore should not be seen as a limitation to the novel scope of the present invention.

The splitter 26 divides the flue gas stream 22 into a recycle stream 22r which sends a portion of the still relatively hot flue gas 22 back toward the combustion chamber 20a of the boiler 20. The hot recirculated flue gas stream 22r provides a fuel and energy savings within the system of the present invention. The treatment stream 22t continues within the pollution treatment method of the present invention, the stream goes on for such processing.

It will be understood that the splitting of gas streams using ducts and dampers is a well known technology. The splitter 26, of the present embodiment, is used to ensure that the volume of gas that is recirculated to the boiler 20 can maintain heat transfer and specifically that it can maintain heat transfer in retrofit systems, as well as keep flame temperatures within the design range for the particular combustion system. It will be understood that through the use of splitter 26, the return or recirculating flow 22r, to the boiler, can range from as much as desired or needed to maintain operating temperatures to toward zero mass, as needed, in some designs.

Continuing along the path of the flue gas stream 22, the treatment stream 22t next passes through a direct contact heat exchanger 28. The heat exchanger 28, in the preferred embodiment, is a counterflow direct contact heat exchanger; wherein the hot fluid, in the nature of the gas stream 22t and the cooling fluid come into direct contact; thereby affecting the transfer of heat and cooling of the pollution laden gas. This is the point at which both sensible and latent heat are recovered from the exhaust gas. It will be understood by those having ordinary skill in the art that indirect heat exchange can also be used. While counter flow is illustrated here, it will be understood that other flow configurations can be used without departing from the novel scope of the present invention. The temperature of the flue gas 22t is lowered and water vapor is condensed out. If acid gases are being removed, as is desirable when using certain types of fuels including high sulfur content coal, then the spray 28s can contain reagents, of types known to persons having ordinary skill in the art, to react with the acid gases and form salts for later removal, in a manner similar to the process in existing spray flue gas desulphurization (FGD) systems. In the present invention the spray 28s can also serve to wash out particulates that are left in the stream. It will be understood by those having ordinary skill in the art that one or more direct contact heat exchangers can be used to maximize heat recovered (through temperature differential) into the power plant working fluid through later indirect exchange by the direct contact heat exchange fluid. The use of more than one direct or indirect contact heat exchanger allows the cooling fluid temperature to be maintained high enough to transfer heat to the power generation thermodynamic cycle while condensing more water vapor and reducing compression work by further cooling in a second exchanger where the heat is not necessarily recovered.

Continuing in FIG. 1, a liquid stream 30 exits the heat exchanger 28 then is passed through a filter or filters 32 to remove particulates. It will be understood that in FIG. 1 a single filter is shown, persons having ordinary skill in the art will understand that multiple filtration stages can be used with the system of the present invention without departing from its novel scope.

As shown in the figure a pump 34 can be used along the fluid circuit to overcome friction and keep the pressure high enough to effectively create the spray 28s of fluid within the direct contact heat exchanger 28. It will be understood that, again, a single pump 34 is shown in FIG. 1 but that there can be multiple pumps in the circuit as needed to keep water circulating and pressure as needed. Further, it will be understood that such pumps can be placed in series or in various locations throughout the circuit as needed, without departing from the novel scope of the present invention.

One or more indirect heat exchangers 36, of a type know to persons having ordinary skill in the art, and specifically where hot fluid and cooling fluid do not come into contact, can be used to further cool the liquid stream 30. Such exchangers are used to drop the temperature of the combined water 30t comprised of cooling water and water condensed 30 from the exhaust gas 22t. Heat can be recovered in this step by transferring the heat removed to the boiler feed water or other thermodynamic working fluids utilized in this system.

It will be understood that the liquid water stream 30 undergoes treatment within the loop of the water's travel if direct heat exchangers are used. Treatment of the water can be of any type known in the art and depending on the various needs of the water in a particular system and/or to meet chemical requirements for recycling into the direct heat exchanger 28. A bleed stream 40 is provided to take excess water out of the closed system, balancing the amount of water condensed in the direct heat exchanger 28. The bleed stream 40 is further treated as needed to purify the water stream to meet local discharge regulations or for local use; a contaminant stream 42 is removed and disposed of as required.

It will be understood that reagents 44, of various types and to fulfill specific requirements depending on local conditions are added to the water stream 30 circulating towards the direct wet heat exchanger 28 to condition the water stream 30 to react with any condensed acids, so that they can be easily removed. The water stream 30 is then injected into the direct contact heat exchanger 28 as a spray 28s, cooling the incoming heated stream 30. As is typical with spray coolers the water injection is designed to have a high surface contact area between the water 30 and the exhaust gas 22t.

It will be understood that the heat exchanger need not necessarily be a direct contact or wet heat exchanger. An indirect heat exchanger where the exhaust gas and cooling water never come into physical contact may be used. If an indirect heat exchanger is used, water condensed from the cooled exhaust gas is bled out of the indirect heat exchanger and sent on for water treatment and disposal.

After exiting the heat exchanger 28, counter-flowing exhaust 46 has lost moisture by the time it gets to the end of the heat exchanger and can then be further dewatered, if necessary, to remove any entrained droplets in the gas stream. The gas stream 46 is then compressed in a series of stages forming a compressed gas stream 50. While only one compressor 48 is shown in FIG. 1, it will be understood that an actual system can have multiple stages of compression, without departing from the novel scope of the present invention. It is important to note that a substantial portion of the compression work can be recovered through the use of cooler power plant working fluids (such as feed water) to exchange heat with the compressed gases thereby adding heat to the working fluid and at the same time improving the efficiency of the compressors.

The compressed gas stream 50 can contain substantial tramp gases at this point. Indications are that a lower purity $CO_2$ (85%-95%) stream is acceptable for many sequestration methods. However, if a higher purity $CO_2$ (>95%-99%) stream is needed, an additional separation stage can be added at this point in the system.

As described, it can be seen that the method of the present invention comprises a cooling step (or multiple cooling steps which can be before and/or after compression stages) and a compression step (or multiple compression steps) which allow for the removal of pollutants and the processing of $CO_2$ from the combustor flue gas. The coolants used to reduce flue gas temperatures can include, but are not limited to plant circulating water, plant condensate (feed water), flue-gas condensates, cold comburent, cold nitrogen, cold argon, and cool flue gas mixture. Cooling can also be supplied by cooling systems such as evaporative cooling or refrigeration. The cooling step enables the compression to take place with lower energy consumption and can serve to condense vapor. Some of the energy transferred into the cooling streams can be recovered. Energy of compression and/or liquefaction can also be recovered through an expansion engine.

Compression of the flue gas increases its temperature. At higher pressures, the increased temperature and reduced specific volume of the post-compression gases makes heat transfer more effective and allows heat exchangers to be relatively small (and therefore less expensive) than those used for traditional heat exchange in low-temperature flue gas heat exchange systems. At ambient pressures, the direct contact exchanger has no advantage due to reduced volume. However, due to denitrification, the use of oxy-fuel reduces the total volume of flow at ambient pressure and therefore makes the heat exchangers smaller. The smaller size of the components will result in a smaller footprint for the equipment and will allow it to be installed in existing plants where there is presently limited space. The use of high pressure will also limit the effect of gravitational head and will allow the components to be stacked, if needed, to further reduce the footprint at a plant.

It will be understood that the invention can produce up to three captured material streams of condensate, and/or gas mixture, and/or supercritical fluid. The first stream is contaminant-laden water containing $SO_x$, residual $NO_x$ particulates and particulate-bound Hg. The second stream can be a low-volume final flue gas stream containing $N_2$ and $O_2$. The final product stream is a mixture comprising predominantly $CO_2$ with smaller amounts of $H_2O$, Ar, $N_2$, $O_2$, $SO_x$, $NO_x$, Hg, and other trace gases. However, the stream is not necessarily of a high enough $CO_2$ purity to be suitable for industrial or food use. The primary target for disposing of the final output of this invention is sequestration methods suitable for $CO_2$ and associated pollutants and gases. To the extent high purity $CO_2$ is desired as a post-process product, compression, cooling, and repeated stripping increase the relative concentration of remaining pollutants in exhaust streams allowing easier purification of the streams for pure-product recovery (e.g. water, $SO_2$, Hg).

The process of the present invention provides at least the following benefits through its implementation: 1) capturing $CO_2$ and delivering a stream of $CO_2$ containing any combination of chemicals including, $H_2O$, Ar, $N_2$, $O_2$, $SO_x$, $NO_x$, and Hg and traces of other post-combustion materials that can be further separated to produce a stream of $\geq 90\%$ pure $CO_2$ for use in $CO_2$-based processes; 2) capturing of pollutants via dissolution and entrainment in direct exchange cooling fluid or through condensed vapors in indirect exchange in the heat exchanger(s); 3) recovery of heat from the flue gas stream; and 4) providing streams containing high concentrations of subject pollutants enabling their separation and isolation more easily. Other benefits will be readily apparent to persons having ordinary skill in the art.

The process of the present invention can also be teamed with oxygen blown IGCC, oxygen-blown fluidized bed, or other processes which produce an oxidation product high in $CO_2$ and ultimately a compressed $CO_2$ stream. Other applications of this process include, but are not limited to, cement production, refineries, the petrochemical industry, oil and gas processing, biomass combustion and other $CO_2$-exhausting processes.

What is claimed is:

1. A method for capturing $CO_2$ from a flue gas resulting from a combustion process, and exhausting a stream of $CO_2$ containing any combination of chemicals including $H_2O$, Ar, $N_2$, $O_2$, $SO_x$, $NO_x$, and Hg and traces of other post-combustion materials the method comprising the steps of:
   combusting a fossil fuel and pure oxygen inside a boiler producing a flue gas;
   conveying at least a portion of the flue gas into at least one heat exchanger defining a first heat exchanger;
   cooling the flue gas in said at least one first heat exchanger with a cooling fluid to a temperature at which condensable vapors are condensed to enable the liquid condensate to be removed as liquid condensate from the heat exchanger;
   filtering the liquid condensate and cooling fluid-defining a filtered liquid condensate so that pollutants are disposed of and pure water is released;
   compressing the gas exiting the first heat exchanger in at least one compressor until it is a $CO_2$ stream suitable for disposal or other applications.

2. The method of claim 1 where the compressing step comprises:
   compressing the gas exiting the heat exchanger in at least one compressor until a $CO_2$ stream exiting the compressor is a supercritical stream.

3. The method of claim 1 where the compressing step comprises:
   compressing the gas exiting the heat exchanger in at least one compressor until a $CO_2$ stream exiting the compressor is a multiphase stream.

4. The method of claim 1 where the compressing step comprises:
   compressing the gas exiting the heat exchanger in at least one compressor until a $CO_2$ stream exiting the compressor is a single-phase mixture.

5. The method of claim 1 further including the step of:
   recycling a portion of the flue gas to the combustion process.

6. The method of claim 1 further including the step of:
   recycling the cooling fluid exiting the first heat exchanger back to the front of the first heat exchanger.

7. The method of claim 6 where the cooling fluid is cooled to the temperature at which it will condense the hot vapors in the flue gas.

8. The method of claim 1 where the combusting step comprises:
   combusting a fossil fuel and pure oxygen inside a boiler producing a flue gas where the fossil fuel is pulverized coal.

9. The method of claim 1 where the cooling step comprises:
   cooling the flue gas in at least one heat exchanger with cooling fluid to the temperature where water vapor is condensed and removed as liquid condensate which exits the heat exchanger where the cooling fluid is water.

10. The method of claim 7 where the cooling fluid enters the heat exchanger as a spray.

11. The method of claim 1 where the heat exchanger is a counterflow direct contact heat exchanger.

12. The method of claim 7 where the cooling fluid is cooled by an indirect heat exchanger.

13. The method of claim 1 further comprising the step of purifying the $CO_2$ stream exiting the compressor until it has purity of >90%.

14. The method of claim 1 wherein heat that is given off during compressing the gas is recaptured.

15. The method as recited of claim 1 further including the steps of:
   directing the $CO_2$ stream to one or more heat exchangers which define second heat exchangers; and
   cooling the $CO_2$ stream with a power plant working fluid by way of said second heat exchangers to recover heat from said $CO_2$ stream.

16. The method as recited of claim 1 further including the step of:
   cooling the filtered liquid condensate with a thermodynamic working fluid by way of a heat exchanger defining a third heat exchanger to recover additional heat from said filtered liquid condensate.

* * * * *